United States Patent
Jnanegowda et al.

(10) Patent No.: US 12,066,847 B2
(45) Date of Patent: Aug. 20, 2024

(54) SOLENOID INITIATOR FOR COMPRESSED FLUID SOURCE REGULATOR VALVE ASSEMBLY

(71) Applicant: Goodrich Corporation, Charlotte, NC (US)

(72) Inventors: Vasantha Kumara Jnanegowda, Bangalore (IN); Poly John, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 189 days.

(21) Appl. No.: 17/836,376

(22) Filed: Jun. 9, 2022

(65) Prior Publication Data

US 2023/0122819 A1    Apr. 20, 2023

(30) Foreign Application Priority Data

Oct. 18, 2021 (IN) .............................. 202141047243

(51) Int. Cl.
| | |
|---|---|
| *G05D 7/01* | (2006.01) |
| *B64D 25/14* | (2006.01) |
| *F16K 17/164* | (2006.01) |
| *F16K 31/06* | (2006.01) |
| *F16K 31/42* | (2006.01) |

(52) U.S. Cl.
CPC ........... *G05D 7/0126* (2013.01); *B64D 25/14* (2013.01); *F16K 17/164* (2013.01); *F16K 31/06* (2013.01); *F16K 31/42* (2013.01)

(58) Field of Classification Search
CPC ...... G05D 7/0126; B64D 25/14; F16K 17/10; F16K 17/164; F16K 31/06; F16K 31/0655; F16K 31/42
See application file for complete search history.

(56) References Cited

U.S. PATENT DOCUMENTS

| | | | |
|---|---|---|---|
| 3,603,344 A * | 9/1971 | Stampfli | F16K 47/10 137/513.3 |
| 6,260,570 B1 * | 7/2001 | Wass | F16K 31/56 441/41 |

(Continued)

FOREIGN PATENT DOCUMENTS

| | | |
|---|---|---|
| EP | 3360772 | 8/2018 |
| EP | 3835211 | 6/2021 |

OTHER PUBLICATIONS

European Patent Office, European Search Report dated Dec. 2, 2022 in Application No. 22200805.4.

*Primary Examiner* — Jessica Cahill
(74) *Attorney, Agent, or Firm* — SNELL & WILMER L.L.P.

(57) ABSTRACT

A regulator valve assembly for a compressed fluid source may comprise a valve housing defining a main fluid channel, a secondary fluid channel, a primary outlet, a primary inlet, and a secondary inlet. A poppet may be located in the main fluid channel, The poppet may define a poppet channel and a poppet outlet. The poppet channel may be fluidly connected to the secondary inlet. A rod may be configured to translate in and out the poppet outlet. A pin may be biased toward the secondary fluid channel. The pin may be configured to translate into a translation path of the rod. A solenoid valve may be configured to control a flow of fluid into the secondary fluid channel.

20 Claims, 10 Drawing Sheets

(56) References Cited

U.S. PATENT DOCUMENTS

| | | | |
|---|---|---|---|
| 10,011,332 B2 | 7/2018 | Michalski | |
| 10,612,677 B2 * | 4/2020 | John | F16K 15/20 |
| 10,612,723 B2 * | 4/2020 | John | F16K 31/0655 |
| 10,946,971 B2 * | 3/2021 | John | A62B 1/20 |
| 11,092,252 B2 | 8/2021 | John et al. | |
| 2003/0131889 A1 * | 7/2003 | Kim | F16K 17/10 |
| | | | 137/491 |
| 2015/0192213 A1 * | 7/2015 | Nomichi | G05D 16/20 |
| | | | 137/488 |
| 2017/0203849 A1 * | 7/2017 | John | B64D 25/14 |
| 2019/0353263 A1 | 11/2019 | John | |
| 2020/0018407 A1 * | 1/2020 | Molfa | F16K 17/403 |
| 2020/0191279 A1 | 6/2020 | John et al. | |
| 2020/0326014 A1 * | 10/2020 | John | F16K 31/124 |
| 2021/0181772 A1 | 6/2021 | John et al. | |
| 2021/0181773 A1 | 6/2021 | Nagaraj et al. | |

* cited by examiner

SOLENOID INITIATOR FOR COMPRESSED FLUID SOURCE REGULATOR VALVE ASSEMBLY

CROSS-REFERENCE TO RELATED APPLICATIONS

This application claims priority to, and the benefit of, India Patent Application No. 202141047243, filed Oct. 18, 2021 (DAS Code C02B) and titled "SOLENOID INITIATOR FOR COMPRESSED FLUID SOURCE REGULATOR VALVE ASSEMBLY," which is incorporated by reference herein in its entirety for all purposes.

FIELD

The present disclosure relates to compressed fluid sources and, in particular, to a regulator valve assembly having a solenoid initiator valve for a compressed fluid source of an evacuation assembly.

BACKGROUND

An emergency evacuation assembly may be used to exit an aircraft absent a jet way or other suitable means of egress for passengers. The evacuation assembly may include an inflatable slide and one or more compressed fluid source(s) configured to inflate the slide. Current compressed fluid sources may include a regulator valve unit, which generally includes a cam actuator attached to a valve rod. The cam actuator is configured to mechanically translate the pull rod in response to deployment of the evacuation slide, thereby allowing fluid to flow to the evacuation slide.

SUMMARY

A regulator valve assembly for a compressed fluid source is disclosed herein. In accordance with various embodiments, the regulator valve assembly may comprise a valve housing defining a main fluid channel, a secondary fluid channel, a primary outlet, a primary inlet, and a secondary inlet. A poppet may be located in the main fluid channel. The poppet defines a poppet channel and a poppet outlet. The poppet channel is fluidly connected to the secondary inlet. A rod is configured to translate in and out the poppet outlet. A pin is biased toward the secondary fluid channel. The pin is configured to translate into a translation path of the rod. A solenoid valve is configured to control a flow of fluid into the secondary fluid channel.

In various embodiments, a first biasing member is configured to bias the rod away from the poppet. In various embodiments, a second biasing is configured to bias the poppet away from a first end of the valve housing. The first end of the valve housing defines the secondary inlet.

In various embodiments, a venting cap including an elastomeric check valve is coupled is coupled to the valve housing. The elastomeric check valve may comprise a vent body and an elastomeric sleeve. The vent body defines a vent port and a vent volume. The vent volume is fluidly coupled to the secondary fluid channel. The elastomeric sleeve is located around the vent body and over the vent port.

In various embodiments, the valve housing further defines a solenoid feed channel fluidly coupled to the primary inlet. In various embodiments, a fluid fitting is coupled to the valve housing, the fluid fitting defining a fluid path. The fluid path is configured to fluidly connect the solenoid feed channel and the secondary fluid channel.

In various embodiments, in a closed position, the solenoid valve is configured to seal an outlet of the fluid path defined by the fluid fitting from an inlet of the fluid path defined by the fluid fitting.

A compressed fluid source is also disclosed herein. In accordance with various embodiments, the compressed fluid source may comprise a bottle and a regulator valve assembly fluidly coupled to the bottle. The regulator valve assembly includes a valve housing, a poppet, a rod, a pin, and a solenoid valve. The valve housing defines a main fluid channel, a secondary fluid channel, a primary outlet, a primary inlet, and a secondary inlet. The poppet is located in the main fluid channel. The poppet defines a poppet channel and a poppet outlet. The poppet channel is fluidly connected to the secondary inlet. The rod is configured to translate in and out the poppet outlet. The pin is biased toward the secondary fluid channel, wherein the pin is configured to translate into a translation path of the rod. The solenoid valve is configured to control a flow of fluid into the secondary fluid channel.

In various embodiments, the regulator valve assembly further comprises a first biasing member configured to bias the rod away from the poppet, and a second biasing member configured to bias the poppet away from a first end of the valve housing. The first end of the valve housing defines the secondary inlet. In various embodiments, the first biasing member is located between a floor of the secondary fluid channel and an upper collar of the rod.

In various embodiments, the valve housing further defines a solenoid feed channel fluidly coupled to the primary inlet. In various embodiments, the regulator valve assembly further comprises a fluid fitting coupled to the valve housing. The fluid fitting defines a fluid path. The fluid path is configured to fluidly connect the solenoid feed channel and the secondary fluid channel.

In various embodiments, when the regulator valve assembly is in a closed position, the solenoid valve seals an outlet of the fluid path defined by the fluid fitting from an inlet of the fluid path defined by the fluid fitting.

In various embodiments, the solenoid valve further comprises a valve seal configured to form a sealing interface with the fluid fitting when the regulator valve assembly is in the closed position. In an open position, a gap is created between the fluid fitting and the valve seal, the gap being configured to allow fluid to flow from the inlet of the fluid path to the outlet of the fluid path.

In various embodiments, the regulator valve assembly further comprises a venting cap coupled to the valve housing. The venting cap may comprise a vent body and an elastomeric sleeve. The vent body defines a vent port and a vent volume. The vent volume is fluidly coupled to the secondary fluid channel. The elastomeric sleeve is located around the vent body and over the vent port.

An evacuation assembly is also disclosed herein. In accordance with various embodiments, the evacuation assembly may comprise an inflatable and a compressed fluid source fluidly coupled to the inflatable. The compressed fluid source includes a regulator valve assembly configured to control a flow of fluid from the compressed fluid source to the inflatable. The regulator valve assembly comprises a valve housing, a poppet, a rod, a pin, and a solenoid valve. The valve housing defines a main fluid channel, a secondary fluid channel, a primary outlet, a primary inlet, and a secondary inlet. The poppet is located in the main fluid channel. The poppet defines a poppet channel and a poppet outlet. The poppet channel is fluidly connected to the secondary inlet. The rod is configured to translate in and out the poppet outlet. The pin is biased toward the secondary fluid channel, wherein the pin is configured to translate into a translation path of the rod. The solenoid valve is configured to control a flow of fluid into the secondary fluid channel.

In various embodiments, the regulator valve assembly further comprises a first biasing member configured to bias the rod away from the poppet. In various embodiments, the regulator valve assembly further comprises a second biasing member configured to bias the poppet away from a first end of the valve housing, the first end of the valve housing defining the secondary inlet. In various embodiments, the first biasing member is located between a floor of the secondary fluid channel and an upper collar of the rod.

In various embodiments, the regulator valve assembly further comprises a fluid fitting coupled to the valve housing, The fluid fitting defines a fluid path configured to fluidly connect the secondary fluid channel and a solenoid feed channel defined by the valve housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines and/or cross-hatching may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

The systems and methods disclosed herein may find particular use in connection with aircraft evacuation assemblies. However, various aspects of the disclosed systems and methods may be adapted for performance in a variety of other inflatable assemblies, for example, inflatable raft assemblies, and/or any other assemblies having charged cylinders. As such, numerous applications of the present disclosure may be realized.

Figure 1:
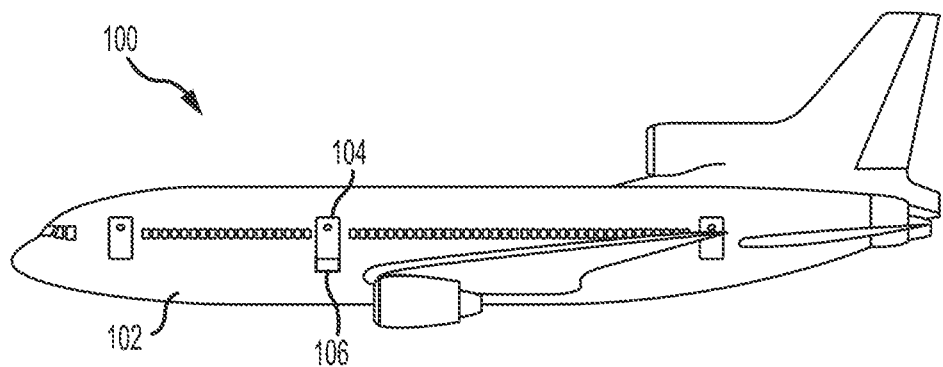
FIG. 1 illustrates an aircraft having, in accordance with various embodiments.

Referring now to FIG. 1, an aircraft 100 is shown. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2:
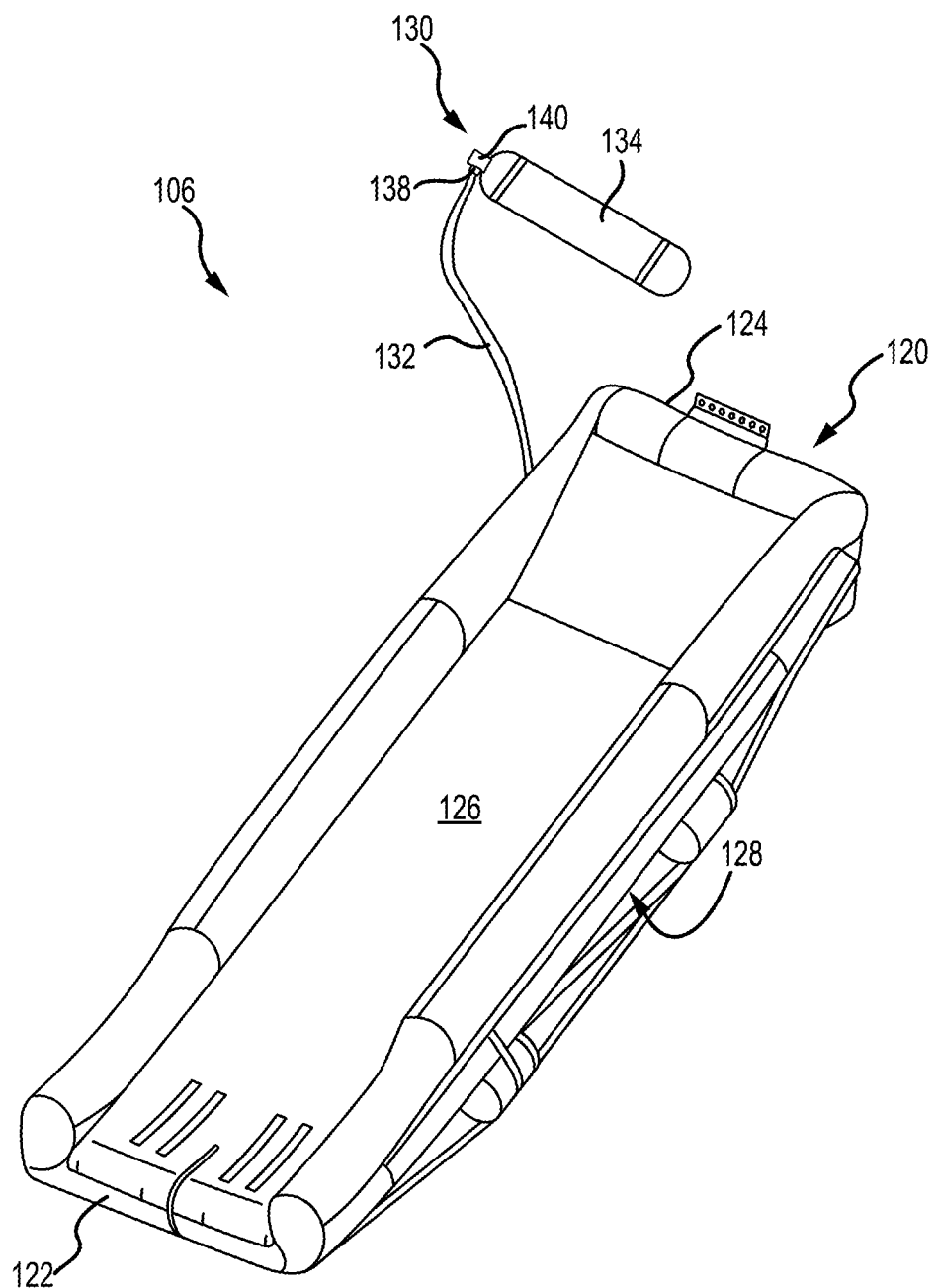
FIG. 2 illustrates an evacuation assembly with the evacuation slide in a deployed position, in accordance with various embodiments.

With reference to FIG. 2, evacuation assembly 106 is illustrated in a deployed position. In accordance with various embodiments, evacuation assembly 106 includes an evacuation slide 120 and a compressed fluid source 130. In various embodiments, evacuation slide 120 includes a toe end 122 and a head end 124 opposite toe end 122. Head end 124 may be coupled to an aircraft structure (e.g., fuselage 102 in FIG. 1). In accordance with various embodiments, evacuation slide 120 is an inflatable slide. Evacuation slide 120 includes a sliding surface 126 and an underside surface 128 opposite sliding surface 126. Sliding surface 126 extends from head end 124 to toe end 122. During an evacuation event, underside surface 128 may be oriented toward an exit surface (e.g., toward the ground or toward a body of water). Evacuation slide 120 is illustrated as a single lane slide; however, evacuation slide 120 may comprise any number of lanes.

Evacuation assembly 106 includes compressed fluid source 130 (also referred to as a charge cylinder). Compressed fluid source 130 is configured to deliver a pressurized fluid (e.g., gas) to inflate evacuation slide 120. Compressed fluid source 130 is fluidly coupled to evacuation slide 120. For example, compressed fluid source 130 may be fluidly coupled to evacuation slide 120 via a hose, or conduit, 132. In response to receiving fluid from compressed fluid source 130, evacuation slide 120 begins to inflate.

In accordance with various embodiments, compressed fluid source 130 includes a bottle 134 and a regulator valve assembly 140. Conduit 132 may be connected to a primary outlet 138 of regulator valve assembly 140. In this regard, regulator valve assembly 140 is fluidly coupled between bottle 134 and conduit 132. As described in further detail below, regulator valve assembly 140 is configured to discharge and regulate the flow of fluid from compressed fluid source 130 to evacuation slide 120. In this regard, when evacuation slide 120 is in a stowed (or deflated) state, regulator valve assembly 140 is in a closed position. In response to deployment of evacuation assembly 106, regulator valve assembly 140 translates to an open position, thereby allowing fluid to flow from bottle 134 of compressed fluid source 130 to evacuation slide 120.

Figure 3:
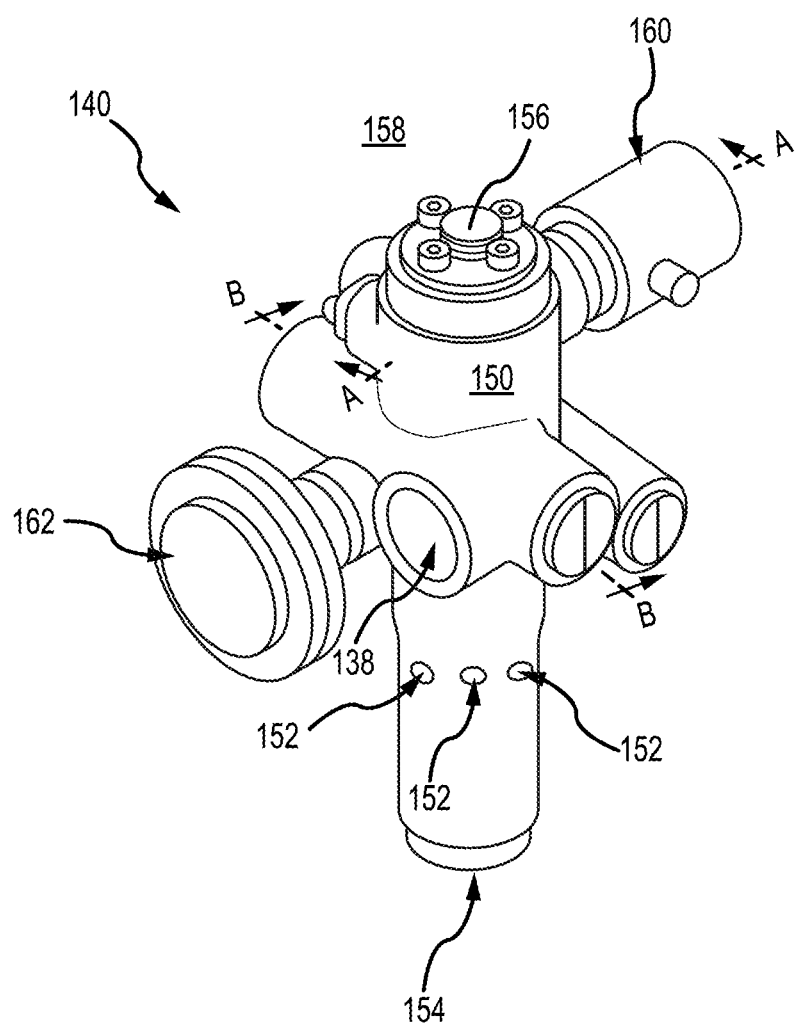
FIG. 3 illustrates a perspective view of a regulator valve assembly for compressed fluid source, in accordance with various embodiments.

With reference to FIG. 3, additional details of regulator valve assembly 140 are illustrated. In accordance with various embodiments, regulator valve assembly 140 includes a valve housing 150 (also referred to as a valve manifold). Valve housing 150 may define primary outlet 138, one or more primary inlets 152, and a secondary inlet 154. Regulator valve assembly 140 is configured to receive fluid from bottle 134 through primary inlets 152 and secondary inlet 154. A venting cap 156 may be coupled to valve housing 150. In various embodiments, and as described in further detail below, venting cap 156 may be configured to vent fluid to an ambient environment 158 (i.e., to an environment exterior to valve housing 150). Regulator valve assembly 140 further includes a solenoid valve 160. Other components of compressed fluid source 130 may also be coupled to valve housing 150. For example, in various embodiments, a pressure gauge 162 may be operatively coupled to compressed fluid source 130 (FIG. 2) via regulator valve assembly 140. Pressure gauge 162 may be configured to measure a pressure of compressed fluid source 130 (with brief reference to FIG. 2).

Figure 4A:
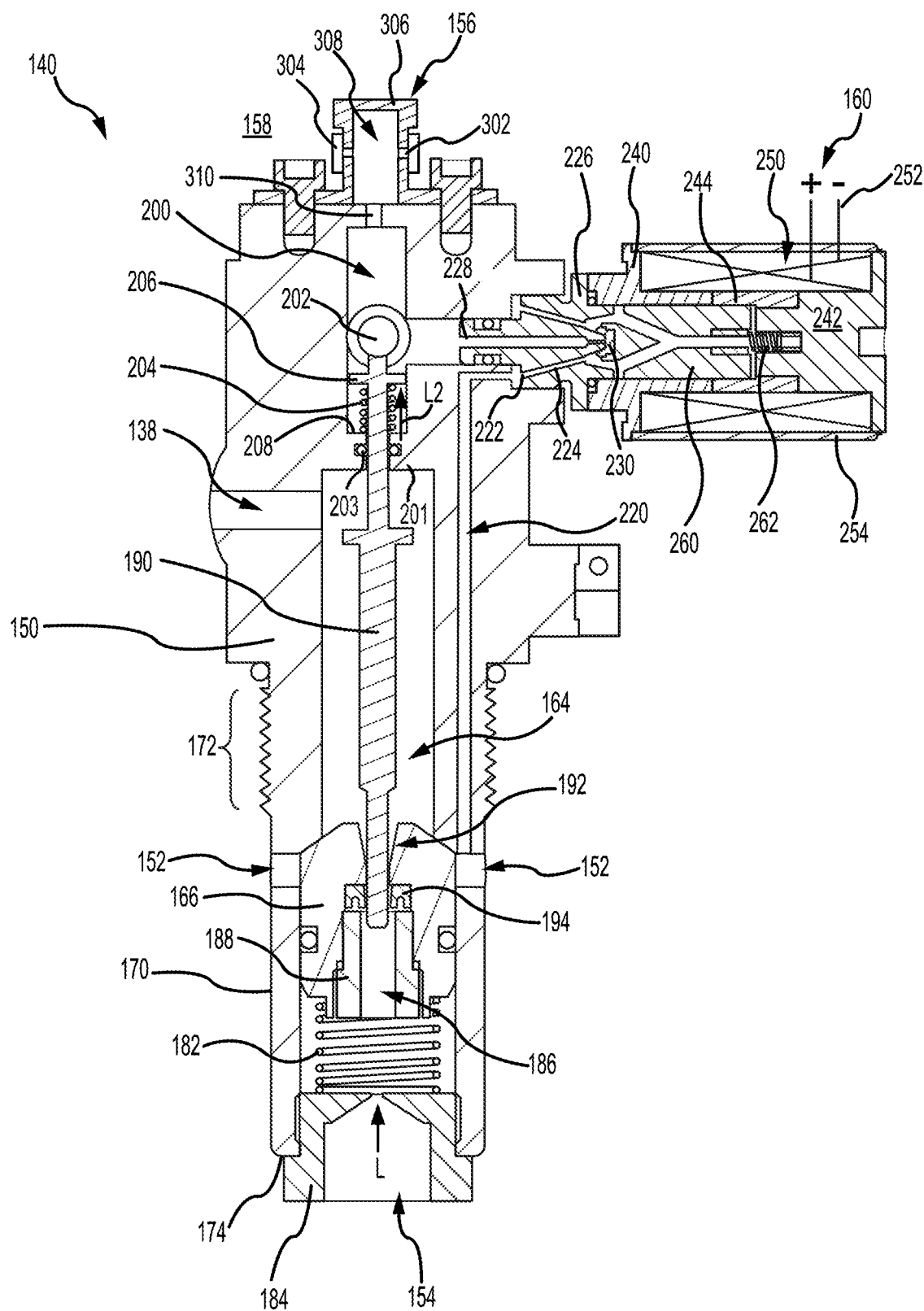
FIG. 4A illustrates a cross-section view of the regulator valve assembly of FIG. 3, taken along the line A-A in FIG. 3, with the regulator valve assembly in a closed position, in accordance with various embodiments.

With additional reference to FIG. 4A, a cross-section view, taken along the line A-A in FIG. 3, of regulator valve assembly 140 in the closed position is illustrated. In accordance with various embodiments, an outer (or exterior) circumferential surface 170 of valve housing 150 may define primary inlets 152. Primary inlets 152 may be located between a threaded portion 172 of outer circumferential surface 170 and a first end 174 of valve housing 150. First end 174 may be opposite venting cap 156. Threaded portion 172 of outer circumferential surface 170 may be configured to engage a threaded surface of bottle 134 (FIG. 2). Valve housing 150 may further define a main fluid channel 164. Main fluid channel 164 is configured to fluidly connect primary inlets 152 and primary outlet 138. In various embodiments, main fluid channel 164 extends from first end 174 to, at least, primary outlet 138.

In accordance with various embodiments, a poppet 166 is located in main fluid channel 164. In the closed position, poppet 166 is located over primary inlets 152, such that poppet 166 blocks, or otherwise prevents, fluid from flowing into main fluid channel 164 via primary inlets 152. In accordance with various embodiments, a biasing member 182 (e.g., a compressed coil spring) applies a biasing load L to poppet 166. Biasing member 182 may bias poppet 166 toward venting cap 156 and away from first end 174.

Figure 5A:
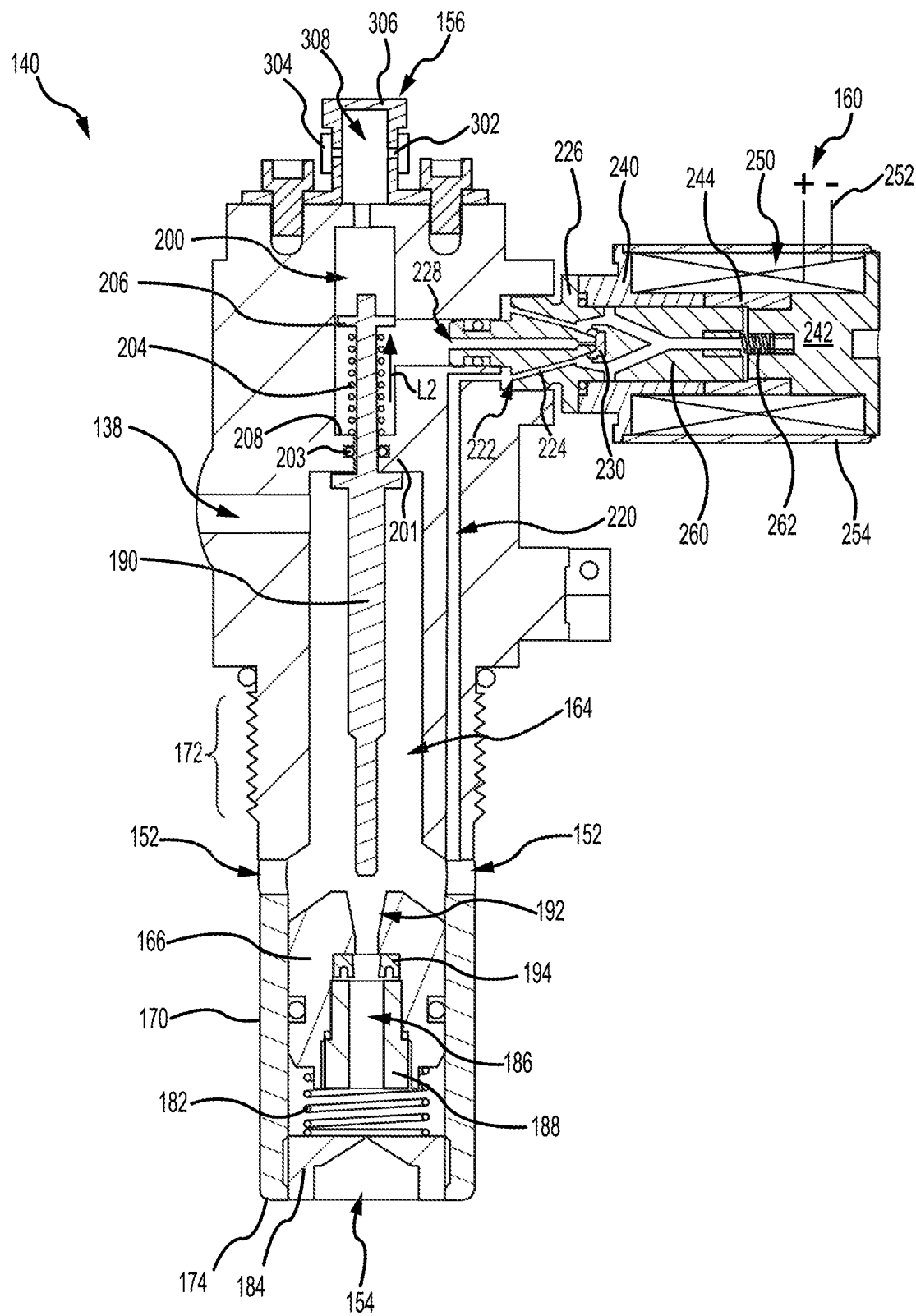
FIG. 5A illustrates a cross-section view of the regulator valve assembly of FIG. 3, taken along the line A-A in FIG. 3, with the regulator valve assembly in an open position, in accordance with various embodiments.
Figure 5B:
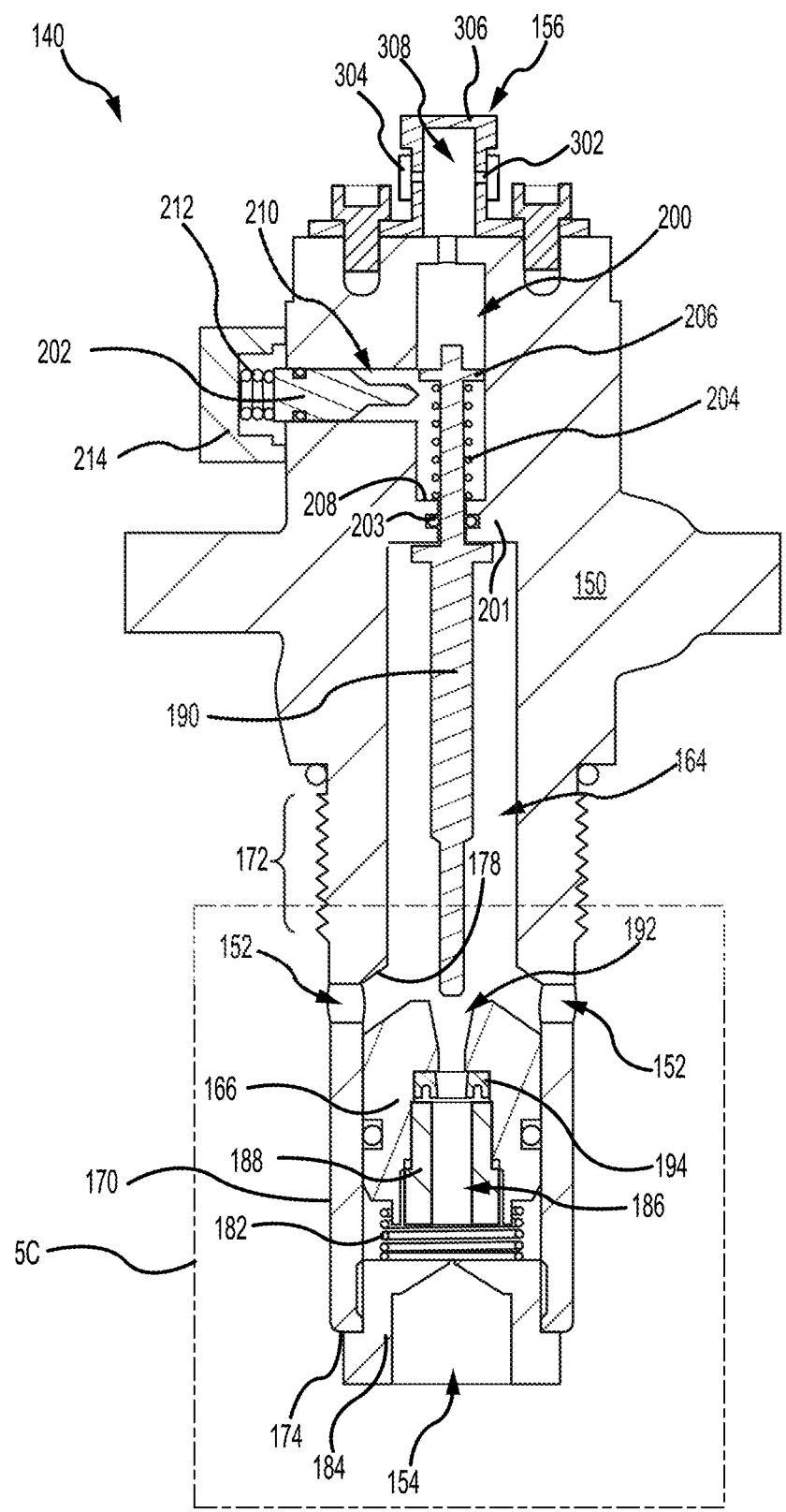
FIG. 5B illustrates a cross-section view of the regulator valve assembly of FIG. 3 taken along the line B-B in FIG. 3, with the regulator valve assembly in the open position, in accordance with various embodiments.
Figure 5C:
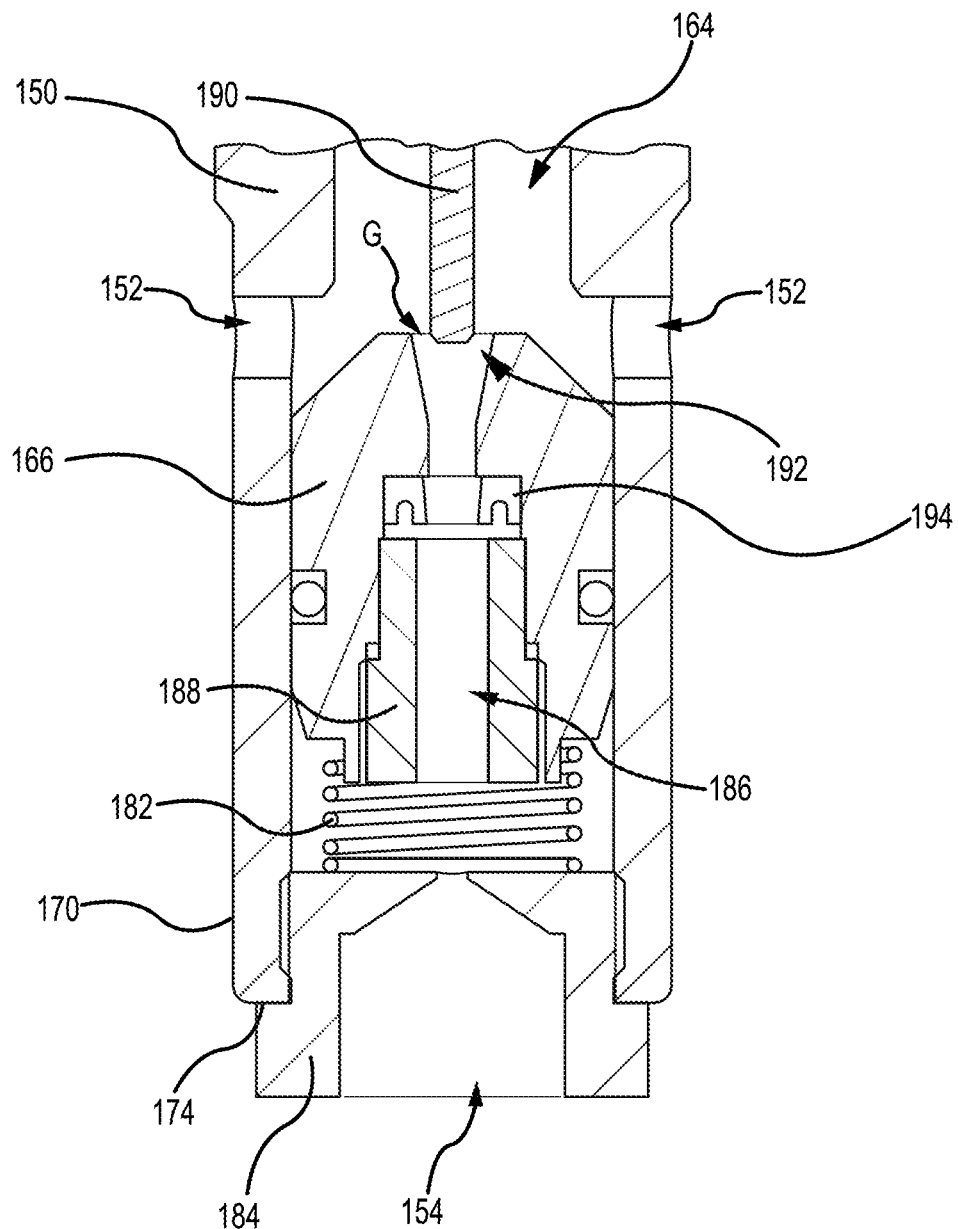
FIG. 5C illustrates the portion of the regulator valve assembly in the box 5C in FIG. 5B, in accordance with various embodiments.

In various embodiments, an end cap 184 may be coupled to first end 174 of valve housing 150. End cap 184 may define secondary inlet 154. Secondary inlet 154 is fluidly coupled to a poppet channel 186 defined by poppet 166. In various embodiments, poppet channel 186 may be defined by a bushing 188 located in poppet 166. Fluid from bottle 134 may flow through secondary inlet 154 and into poppet channel 186. In the closed position, the fluid in poppet channel 186 tends to generate a force in the direction of venting cap 156 (i.e., away from first end 174). This force, along with the biasing load L, forces poppet 166 toward primary outlet 138 and venting cap 156, and into contact with a poppet interface surface 178 (FIG. 5B) of valve housing 151.

In accordance with various embodiments, a rod 190 is located in a poppet outlet 192 defined by poppet 166. In the closed position, rod 190 forms a sealing interface with poppet 166, such that fluid is blocked from flowing through poppet outlet 192 and into main fluid channel 164. In various embodiments, poppet 166 may include a poppet-rod seal 194. Poppet-rod seal 194 may form the sealing interface with rod 190, thereby preventing fluid from flowing out poppet outlet 192 and into main fluid channel 164.

Rod 190 extends through main fluid channel 164 and into a secondary fluid channel 200. Secondary fluid channel 200 is also defined by valve housing 150. Secondary fluid channel 200 is located closer to venting cap 156, as compared to main fluid channel 164. A bulkhead 201 of valve housing 150 may generally separate secondary fluid channel 200 from main fluid channel 164. Rod 190 may extend through bulkhead 201. A bulkhead seal 203 may be located in a seal cavity defined by bulkhead 201. Bulkhead seal 203 may form sealing interfaces with rod 190 and bulkhead 201, thereby blocking, or otherwise preventing, fluid flow between secondary fluid channel 200 and main fluid channel 164.

In the closed position, a pin 202 is located in the path of rod 190. Pin 202 generates an interference with rod 190 and blocks rod 190 from translating away from poppet 166. In the closed position, pin 202 prevents rod 190 from translating out poppet outlet 192. In this regard, pin 202 being located in the translation path of rod 190 maintains the sealing interface between rod 190 and poppet-rod seal 194, thereby preventing fluid from flowing into main fluid channel 164 via poppet outlet 192.

In various embodiments, a biasing member 204 (e.g., a compressed coil spring) may apply a biasing load L2 to rod 190. Biasing member 204 (also referred to as rod biasing member) may be located between an upper collar 206 of rod 190 and a surface 208 of valve housing 150. In various embodiments, surface 208 of valve housing 150 may form a floor of secondary fluid channel 200 opposite venting cap 156. Surface 208 may be formed by bulkhead 201. Biasing member 204 biases upper collar 206 away from surface 208. In this regard, biasing member 204 biases rod 190 away from poppet 166.

Figure 4B:
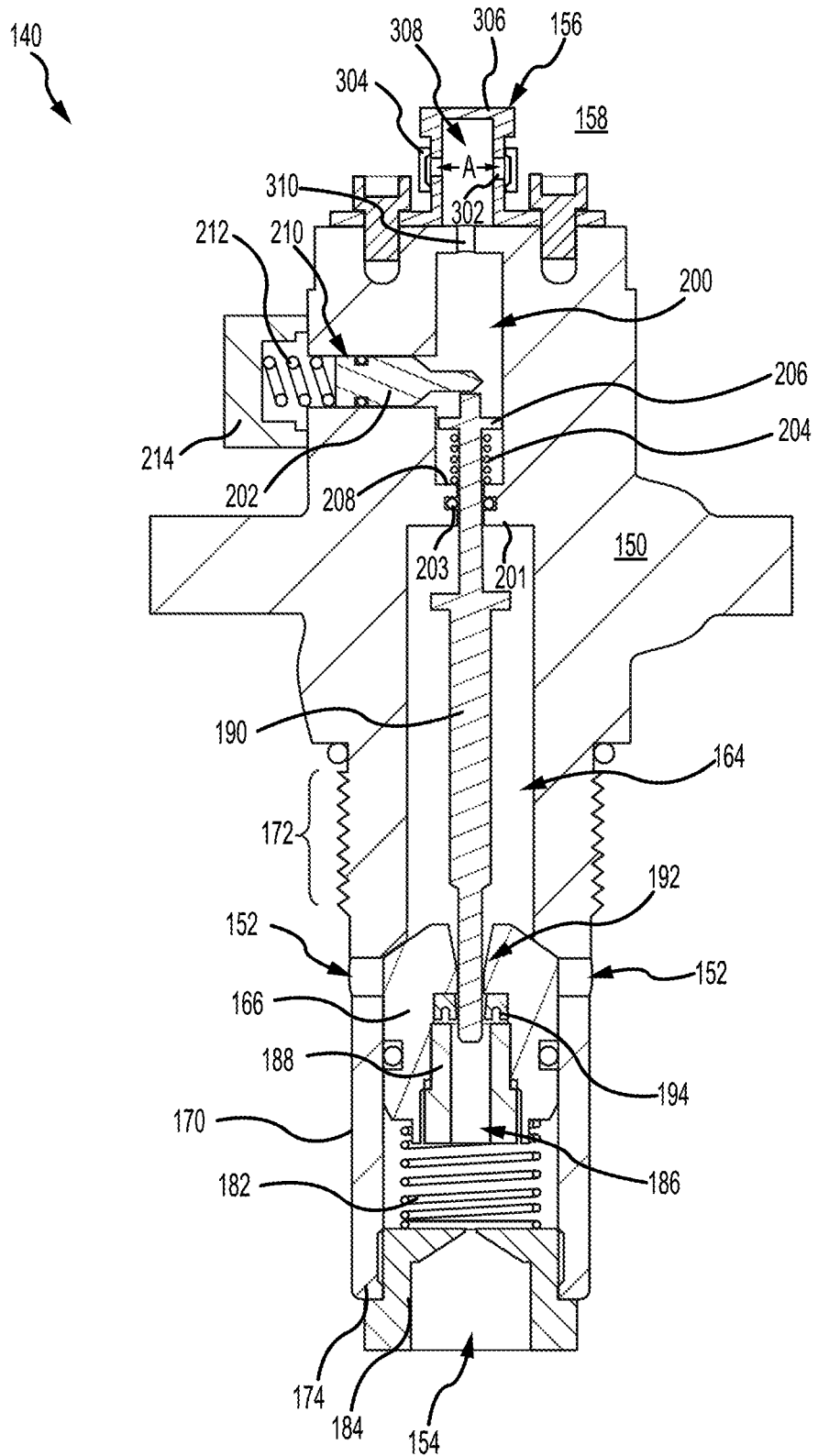
FIG. 4B illustrates a cross-section view of the regulator valve assembly of FIG. 3 taken along the line B-B in FIG. 3, with the regulator valve assembly in the closed position, in accordance with various embodiments.

Referring to FIG. 4B, a cross-section view, taken along line B-B in FIG. 3, of regulator valve assembly 140 in the closed position is illustrated. In accordance with various embodiments, pin 202 may be biased toward secondary fluid channel 200. Pin 202 may be biased in a direction perpendicular to the direction in which rod 190 translates. Pin 202 is located in a pin orifice 210 defined by valve housing 150. In various embodiments, a coil spring 212, or other biasing member, biases pin 202 toward secondary fluid channel 200 and into the path of rod 190. Coil spring 212 may be located in pin orifice 210 and between pin 202 and a pin cap 214 coupled to valve housing 150. In the closed position, the force applied to pin 202 by fluid within secondary fluid channel 200 (e.g., the fluid force) is less than the biasing force applied by coil spring 212 to pin 202. The biasing force applied by coil spring 212 being greater than the fluid force results in pin 202 being located in the path of rod 190.

Returning to FIG. 4A, valve housing 150 may further define a solenoid feed channel 220. Solenoid feed channel 220 is fluidly connected between a primary inlet 152 of valve housing 150 and of a fluid path 224 defined by a fluid fitting 226. Solenoid feed channel 220 extends from primary inlet 152 to a fluid path inlet 222 of fluid path 224. Fluid may flow from solenoid feed channel 220 and into fluid path 224 via fluid path inlet 222. Fluid fitting 226, which defines fluid path 224 and fluid path inlet 222, may be coupled to valve housing 150. A fluid path outlet 228 of fluid path 224 is configured to provide fluid to secondary fluid channel 200. Fluid may flow from fluid path 224 and into secondary fluid channel 200 via fluid path outlet 228. In this regard, when solenoid valve 160 is in the open position (FIG. 5A), fluid may flow from solenoid feed channel 220, through fluid path 224, and into secondary fluid channel 200.

In accordance with various embodiments, in the closed position, a valve seal 230 of solenoid valve 160 forms a fluid tight seal (i.e., a sealing interface) with fluid fitting 226, thereby fluidly sealing fluid path inlet 222 from fluid path outlet 228. The sealing interface formed between valve seal 230 and fluid fitting 226 prevents fluid from bottle 134 from flowing into secondary fluid channel 200.

Though valve seal 230 and fluid fitting 226 are designed for extremely high internal leak tightness, minor leakage may occur. Leaked fluid flowing into secondary fluid channel 200 may result in a pressure increase in secondary fluid channel 200, which could lead to translation of pin 202 out of the path of rod 190 and unwanted opening of the regulator valve assembly 140. In various embodiments, venting cap 156 may be configured to vent leaked fluid within secondary fluid channel 200 into an ambient environment 158, thereby reducing or eliminating an undesired pressure increase in secondary fluid channel 200. In various embodiments, venting cap 156 may be an elastomeric check valve that includes one or more vent port(s) 302 covered by an elastomeric sleeve 304. In various embodiments, venting cap 156 includes a vent body 306 defining vent port(s) 302 and a vent volume 308. In normal operation, fluid leaked into the secondary fluid channel 200 may flow into vent volume 308 via a housing port 310 defined by valve housing 150. Elastomeric sleeve 304 surrounds the vent body 306 such that elastomeric sleeve 304 covers or is in close proximity to vent ports 302. Elastomeric sleeve 304 generates a sealing force to make the vent ports 302 leak tight and isolate the vent volume 308 from the surrounding ambient environment 158. As such, the elastomeric sleeve 304 can serve to keep water or other contaminants out of the vent volume 308.

When the pressure within vent volume 308 is less than a threshold, elastomeric sleeve 304 is compressed on vent body 306, as shown in FIGS. 4A, such that fluid in vent volume 308 cannot exit venting cap 156. When the pressure within vent volume 308 is greater than the threshold, elastomeric sleeve 304 expands (e.g., deflects) away from the vent body 306 proximate vent ports 302 such that fluid within in vent volume 308 can exit venting cap 156 as indicated by arrows A in FIG. 4B.

In accordance with various embodiments, fluid leaked into secondary fluid channel 200 flows into the vent volume 308 of vent body 306. Accumulation of the leaked fluid eventually develops a fluid pressure greater than the pressure of ambient environment 158. This increased pressure starts to radially push out elastomeric sleeve 304 causing elastomeric sleeve 304 to deflect radially (e.g., away from vent volume 308) as shown in FIG. 4B. The radial deflection of elastomeric sleeve 304 increases with pressure build up. The increased deflection eventually develops narrow gaps at the interface between elastomeric sleeve 304 and vent body 306, thereby allowing fluid to be discharged to the ambient environment 158. The flow of fluid into ambient environment 158 decreases the pressure within vent volume 308. Elastomeric sleeve 304 contracts back to the configuration shown in FIG. 4A, in response to the pressure within vent volume 308 decreasing below the threshold. In this manner, elastomeric sleeve 304 operates as a check valve to vent the leaked fluid to ambient environment 158. Elastomeric sleeve 304 can be formed of materials such as nitrile or ethylene propylene diene methylene (EPDM). The material properties, elastomeric sleeve dimensions, and the initial stretch decide the initial sealing force and should be less than the force applied by coil spring 212, such that elastomeric sleeve 304 will deform and vent fluid to ambient environment 158 prior to leaked fluid within secondary fluid channel 200 forcing pin 202 to translate out of the path of rod 190.

Figure 4C:
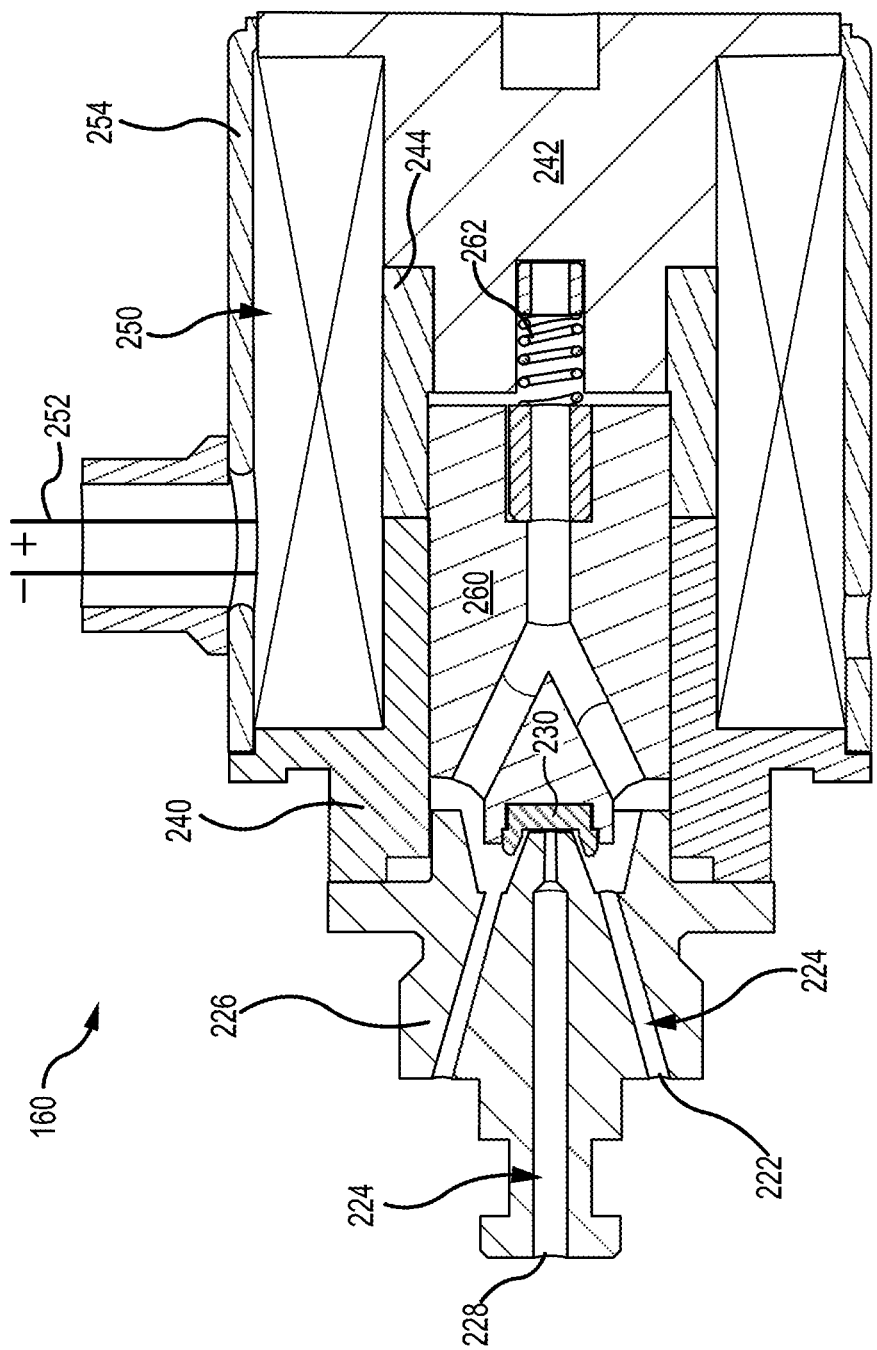
FIG. 4C illustrates a cross-section view of the solenoid valve of the regulator valve assembly of FIG. 4A, with the solenoid valve in a closed state, in accordance with various embodiments.

With combined reference to FIG. 4A and FIG. 4C, in accordance with various embodiments, solenoid valve 160 includes a core 240 and a bobbin 242. Core 240 may engage fluid fitting 226. Bobbin 242 may engage a core fitting 244. Core fitting 244 is formed of a non-magnetic material. Core 240 and bobbin 242 are made of a magnetic material, such as a ferrous metal.

In accordance with various embodiments, a solenoid coil 250 is wrapped helically around core 240, bobbin 242, and core fitting 244. A set of lead wires 252 (e.g., a positive lead wire and a ground lead wire) is electrically coupled to solenoid coil 250. Solenoid coil 250 is configured to generate a magnetic field in response to receiving a current via wires 252.

A cover 254 may be located around solenoid coil 250. Cover 254 may be coupled, via adhesive, welding, fasteners, or any other suitable attachment to bobbin 242 and/or to core 240. Solenoid valve 160 further includes a plunger 260. Plunger 260 comprises a ferrous metal. Plunger 260 is configured such that plunger 260 will translate in response to the magnetic field generated by solenoid coil 250. In this regard, the magnetic field generated by solenoid coil 250 forces plunger 260 away from fluid fitting 226. Valve seal 230 may be coupled to plunger 260 such that valve seal 230 translates with plunger 260 relative to fluid fitting 226. Plunger 260 is biased toward fluid fitting 226. In various embodiments, a coil spring 262, or other biasing member, may bias plunger 260 toward fluid fitting 226. In the closed position, the biasing load applied by coil spring 262 to plunger 260 maintains a fluid tight seal between fluid fitting 226 and valve seal 230.

Figure 5D:
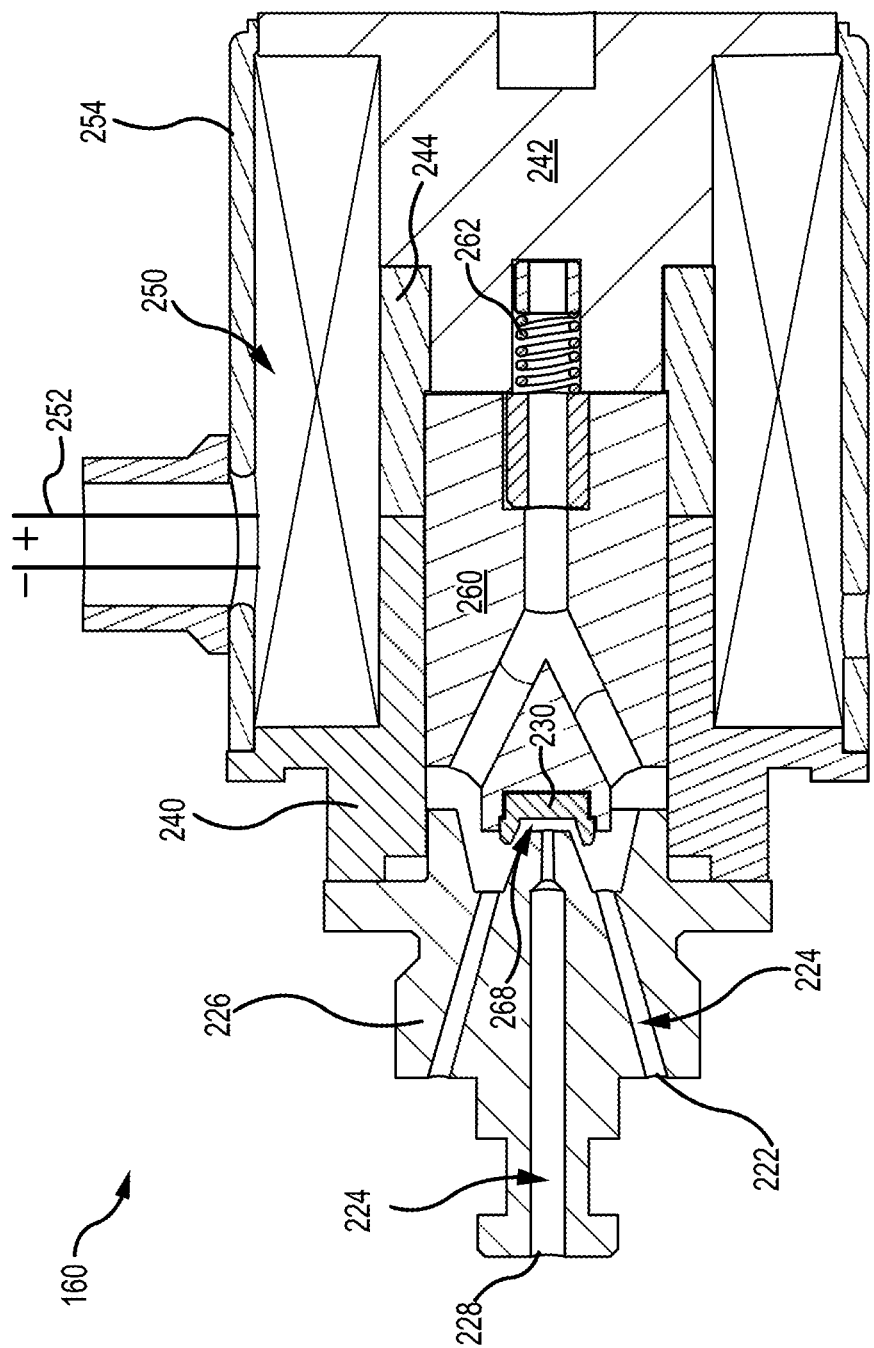
FIG. 5D illustrates a cross-section view of the solenoid valve of the regulator valve assembly of FIG. 5A, with the solenoid valve in an open state, in accordance with various embodiments.

In response to receiving current via lead wires 252, solenoid coil 250 generates a magnetic field. In various embodiments, current begins to flow to solenoid coil 250 in response to activation of a power source. The power source may be activated in response to deployment of evacuation assembly 106 (FIG. 1), for example, in response to opening exit door 104 (FIG. 1). The electromagnetic force being greater than the biasing load applied by coil spring 262, causes plunger 260 and valve seal 230 to translate away from fluid fitting 226, thereby creating a gap 268 (FIG. 5D) between valve seal 230 and fluid fitting 226.

Referring additionally now to FIGS. 5A, 5B, 5C, and 5D, regulator valve assembly 140 is illustrated in the open position. In the open position, the gap 268 (FIG. 5D) between valve seal 230 and fluid fitting 226 fluidly connects fluid path inlet 222 and fluid path outlet 228 of fluid fitting 226, thereby allowably fluid from bottle 134 (FIG. 2) to flow into to secondary fluid channel 200. In the open position, fluid from bottle 134 may flow from primary inlet 152, through solenoid feed channel 220, into fluid path 224 in fluid fitting 226, and then into secondary fluid channel 200. As fluid flows into secondary fluid channel 200 a pressure within secondary fluid channel 200 and the fluid force applied to pin 202 increase. Pin 202 translates toward pin cap 214 in response to fluid force applied to pin 202 exceeding the biasing force applied by coil spring 212. In the open position, the flow of fluid into secondary fluid channel 200 forces pin 202 to translates out the path of rod 190.

In response to the interference between pin 202 and rod 190 being removed, the force applied to rod 190 by biasing member 204 causes rod 190 to translate toward venting cap 156 and out poppet outlet 192, thereby fluidly connecting poppet channel 186 and main fluid channel 164. Translation of rod 190 away from poppet outlet 192 generates a gap G (FIG. 5C) between rod 190 and poppet 166 through which fluid from secondary inlet 154 can flow into main fluid channel 164.

In the open position, fluid from bottle 134 (FIG. 2) flows into poppet channel 186 via secondary inlet 154, and then into main fluid channel 164 via poppet outlet 192. The flow of fluid into main fluid channel 164 decreases the pressure in poppet channel 186. The decreased pressure is such that the force applied by the fluid flowing through primary inlets 152 exceeds the biasing force of biasing member 182, thereby causing poppet 166 to translate toward first end 174. Stated differently, poppet 166 translates away from primary outlet 138 in response to rod 190 translating out of poppet outlet 192. Thus, in the open position, poppet 166 does not block the fluid connection between primary inlets 152 and main fluid channel 164. Stated differently, in the open position, fluid from bottle 134 may flow through primary inlets 152, into main fluid channel 164, out primary outlet 138, and into evacuation slide 120 (FIG. 2).

Employing solenoid valve 160 to control the flow of fluid into secondary fluid channel 200 and thus, the translation of rod 190, allows the translation of regulator valve assembly 140 to the open position to be electrically controlled. Electrically controlling the opening of regulator valve assembly 140 tends to allow for increased timing accuracy and/or more precise control of the inflation of evacuation slide 120 (FIG. 2).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A regulator valve assembly for a compressed fluid source, the regulator valve assembly comprising:
   a valve housing defining a main fluid channel, a secondary fluid channel, a primary outlet, a primary inlet, and a secondary inlet;
   a poppet located in the main fluid channel, the poppet defining a poppet channel and a poppet outlet, the poppet channel being fluidly connected to the secondary inlet;
   a rod configured to translate in and out the poppet outlet;
   a pin biased toward the secondary fluid channel, wherein the pin is configured to translate into a translation path of the rod; and
   a solenoid valve configured to control a flow of fluid into the secondary fluid channel.

2. The regulator valve assembly of claim 1, further comprising a first biasing member configured to bias the rod away from the poppet.

3. The regulator valve assembly of claim 2, further comprising a second biasing member configured to bias the poppet away from a first end of the valve housing, the first end of the valve housing defining the secondary inlet.

4. The regulator valve assembly of claim 3, further comprising a venting cap including an elastomeric check valve coupled to the valve housing, wherein the elastomeric check valve comprising:
   a vent body defining a vent port and a vent volume, the vent volume being fluidly coupled to the secondary fluid channel; and
   an elastomeric sleeve located around the vent body and over the vent port.

5. The regulator valve assembly of claim 1, wherein the valve housing further defines a solenoid feed channel fluidly coupled to the primary inlet.

6. The regulator valve assembly of claim 5, further comprising a fluid fitting coupled to the valve housing, the fluid fitting defining a fluid path, wherein the fluid path is configured to fluidly connect the solenoid feed channel and the secondary fluid channel.

7. The regulator valve assembly of claim 6, wherein in a closed position, the solenoid valve is configured to seal an outlet of the fluid path defined by the fluid fitting from an inlet of the fluid path defined by the fluid fitting.

8. A compressed fluid source, comprising:
   a bottle; and
   a regulator valve assembly fluidly coupled to the bottle, the regulator valve assembly including:
      a valve housing defining a main fluid channel, a secondary fluid channel, a primary outlet, a primary inlet, and a secondary inlet;
      a poppet located in the main fluid channel, the poppet defining a poppet channel and a poppet outlet, the poppet channel being fluidly connected to the secondary inlet;
      a rod configured to translate in and out the poppet outlet;
      a pin biased toward the secondary fluid channel, wherein the pin is configured to translate into a translation path of the rod; and
      a solenoid valve configured to control a flow of fluid into the secondary fluid channel.

9. The compressed fluid source of claim 8, wherein the regulator valve assembly further comprises:
   a first biasing member configured to bias the rod away from the poppet; and
   a second biasing member configured to bias the poppet away from a first end of the valve housing, the first end of the valve housing defining the secondary inlet.

10. The compressed fluid source of claim 9, wherein the first biasing member is located between a floor of the secondary fluid channel and an upper collar of the rod.

11. The compressed fluid source of claim 10, wherein the valve housing further defines a solenoid feed channel fluidly coupled to the primary inlet.

12. The compressed fluid source of claim 11, wherein the regulator valve assembly further comprises a fluid fitting coupled to the valve housing, the fluid fitting defining a fluid path, wherein the fluid path is configured to fluidly connect the solenoid feed channel and the secondary fluid channel.

13. The compressed fluid source of claim 12, wherein when the regulator valve assembly is in a closed position, the solenoid valve seals an outlet of the fluid path defined by the fluid fitting from an inlet of the fluid path defined by the fluid fitting.

14. The compressed fluid source of claim 13, wherein the solenoid valve further comprises a valve seal configured to form a sealing interface with the fluid fitting when the regulator valve assembly is in the closed position, and wherein in an open position, a gap is created between the fluid fitting and the valve seal, the gap being configured to allow fluid to flow from the inlet of the fluid path to the outlet of the fluid path.

15. The compressed fluid source of claim 14, wherein the regulator valve assembly further comprises a venting cap coupled to the valve housing and comprising:
   a vent body defining a vent port and a vent volume, the vent volume being fluidly coupled to the secondary fluid channel; and
   an elastomeric sleeve located around the vent body and over the vent port.

16. An evacuation assembly, comprising:
   an inflatable; and
   a compressed fluid source fluidly coupled to the inflatable, the compressed fluid source including a regulator valve assembly configured to control a flow of fluid from the compressed fluid source to the inflatable, the regulator valve assembly comprising:
      a valve housing defining a main fluid channel, a secondary fluid channel, a primary inlet, and a secondary inlet;
      a poppet located in the main fluid channel, the poppet defining a poppet channel and a poppet outlet, the poppet channel being fluidly connected to the secondary inlet,
      a rod configured to translate in and out the poppet outlet;
      a pin biased toward the secondary fluid channel, wherein the pin is configured to translate into a transition path of the rod; and
      a solenoid valve configured to control the flow of fluid into the secondary fluid channel.

17. The evacuation assembly of claim 16, wherein the regulator valve assembly further comprises a first biasing member configured to bias the rod away from the poppet.

18. The evacuation assembly of claim 17, wherein the regulator valve assembly further comprises a second biasing member configured to bias the poppet away from a first end of the valve housing, the first end of the valve housing defining the secondary inlet.

19. The evacuation assembly of claim 17, wherein the first biasing member is located between a floor of the secondary fluid channel and an upper collar of the rod.

20. The evacuation assembly of claim 17, wherein the regulator valve assembly further comprises a fluid fitting coupled to the valve housing, the fluid fitting defining a fluid path wherein the fluid path is configured to fluidly connect the secondary fluid channel and a solenoid feed channel defined by the valve housing.

* * * * *